Jan. 12, 1971  M. LIPSKY ET AL  3,554,770
PACKAGED FOOD PRODUCT
Filed Nov. 17, 1964  2 Sheets-Sheet 1
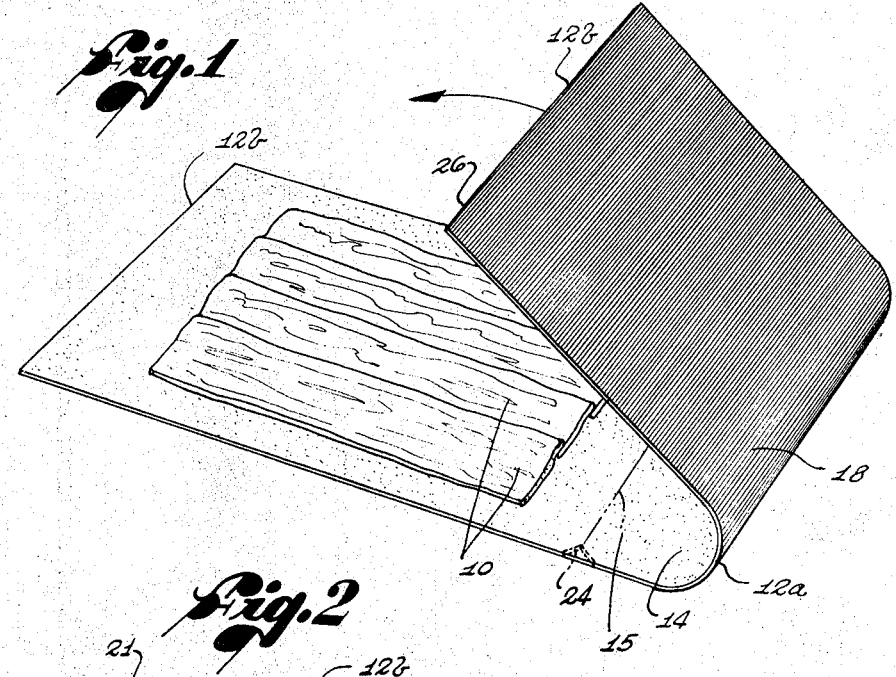
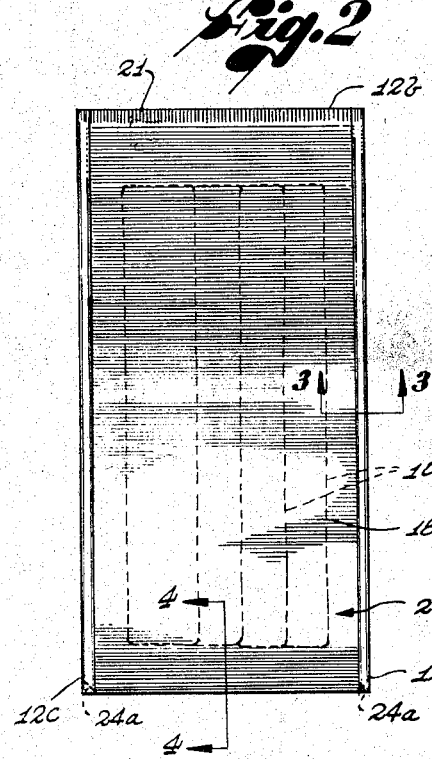
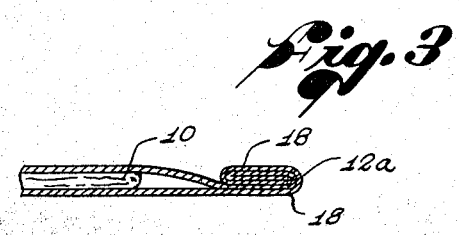
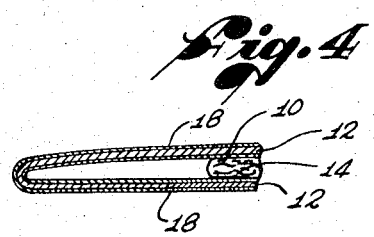
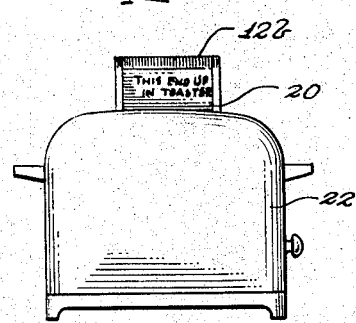
INVENTORS
MARCUS LIPSKY
WILLIAM J. MAHAN
BY Fulwider, Patton, Rieber,
Lee, and Utecht
ATTORNEYS Jan. 12, 1971     M. LIPSKY ET AL     3,554,770
PACKAGED FOOD PRODUCT
Filed Nov. 17, 1964     2 Sheets-Sheet 2
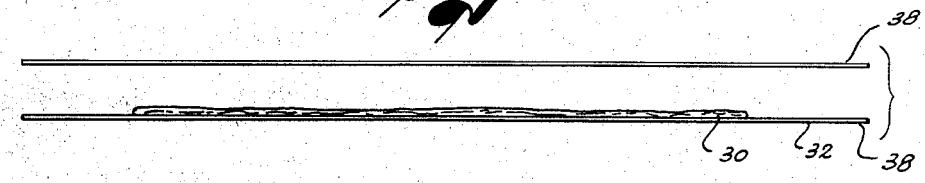
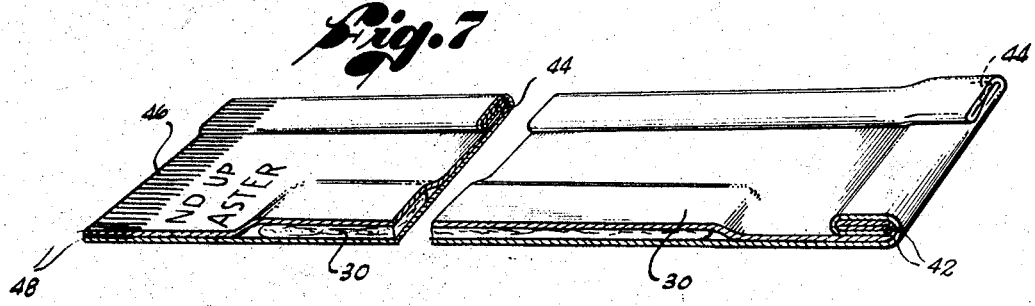
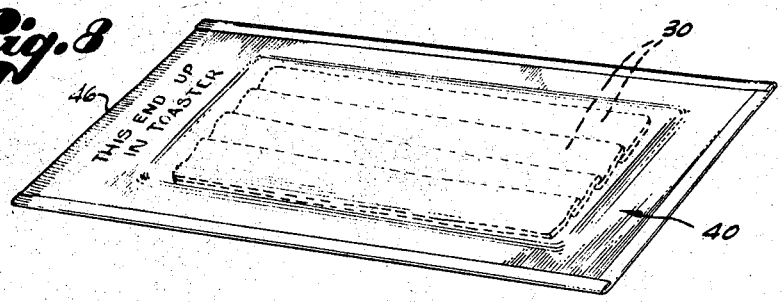
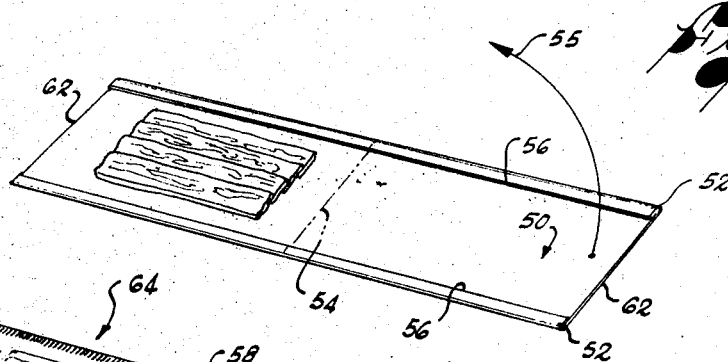
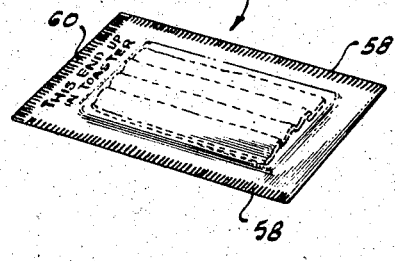
INVENTORS
MARCUS LIPSKY
WILLIAM J. MAHAN
BY Fulwider Patton, Rieber, Lee, and Utecht
ATTORNEYS

United States Patent Office 3,554,770
Patented Jan. 12, 1971

3,554,770
PACKAGED FOOD PRODUCT
Marcus Lipsky and William J. Mahan, Los Angeles, Calif.; Dorothy C. Mahan, executrix of the estate of said William J. Mahan, assignor, by mesne assignments, to Hunt-Wesson Foods, Inc., Fullerton, Calif., a corporation of Delaware
Filed Nov. 17, 1964, Ser. No. 411,740
Int. Cl. B65b 25/06; B65d 85/00
U.S. Cl. 99—174                              11 Claims

ABSTRACT OF THE DISCLOSURE

A package for heating precooked food formed from a sheet material comprising an inner plastic layer, an intermediate metal foil layer and an outer electrically-insulative layer. The package is rectangular such that one end extends out of a heating unit when the food is being heated. The edges of the sheet material are electrically insulated by folding the edges (with the exception of the edge extending out of the heating unit) so that the foil layer is completely enclosed by the outer electrically-insulative layer.

---

This invention relates generally to improvements in packaging of precooked food products—which are to be reheated in a toaster just prior to use. More particularly, this invention relates to the packaging of a precooked sliced bacon product—which is to be heated in a toaster prior to use.

Aluminum foil packaging for precooked food products, such as precooked sliced bacon, is known. See, for example, the patent to Zarotschenzeff Pat. No. 2,807,550. The instant invention provides other substantial advances in the art of packaging food products for heating in a toaster or the like.

Among the advances in the art, made by the present invention are (1) means for electrically insulating the metal foil package so that it can be placed between closely spaced heating coils or elements without danger of the metal foil causing a short circuit between said heating elements (such closely spaced heating elements are found in most toasters on the market); and (2) means for preventing contact of the metal foil package with the food product contained therein which same means performs a second function, that of enabling final sealing of the package to be readily and effectively performed.

Bearing in mind the foregoing, it will be understood that a major object of the present invention is to provide a packaged food product which is completely electrically insulated so that it can be placed in a toaster without fear of short circuit. Secondly, another object is to provide a packaged food product which cannot come into contact with the metal foil walls of the package and which is nevertheless thin enough to be readily inserted in the conventionally sized slot of a toaster.

These and other objects of the invention will become clearly understood with reference to the following descriptions and to the accompanying drawings wherein:

FIG. 1 is a perspective view of the metal foil used to package a food product such as a plurality of overlapping bacon slices and illustrates schematically the first step in the packaging operation;

FIG. 2 is a plan view of the completed package of this invention;

FIG. 3 is a fragmentary cross-sectional view taken along line 3—3 of FIG. 2;

FIG. 4 is a fragmentary cross-sectional view taken along line 4—4 of FIG. 2;

FIG. 5 is a schematic showing of the packaged food product in a toaster;

FIG. 6 is a side elevational view of a portion of a pair of continuous webs of metal foil used in a modified form of packaging of the food product and illustrates, schematically, the first step in this modified packaging operation;

FIG. 7 is a view, in longitudinal cross-section, of the completed packaged food product resulting from the modified packaging operation shown in FIG. 6;

FIG. 8 is a perspective view of the completed packaged food product resulting from the modified packaging operation shown in FIG. 6;

FIG. 9 is a perspective view of still another modified form of metal foil used to package a food product and illustrates schematically the first step in this other modified form of packaging; and FIG. 10 is a perspective view of the completed packaged food product resulting from the modified packaging operation shown in FIG. 9.

The following description will refer specifically to the packaging of precooked sliced bacon although it should be understood that the invention is applicable to the packaging of any food products that are thin enough to be inserted in a toaster.

The bacon, generally employed in this invention, is derived preferably from hog bellies which after smoking are in the 9 to 11 pound range of smoked weight (10–12 pounds green weight). Bellies of higher or lower weight may also be employed; however the 9 to 11 pound weight is found particularly advantageous where a bacon slice of between 5" to 6½" in length is desired.

Green bellies are those bellies taken directly from the hog. The green bellies are then cured in accordance with certain more or less standard formulations which include salt. The cured bellies are next smoked and chilled. The smoked bellies are then prepared for slicing into bacon by being mechanically pressed to a size of preferably 8" to 8½" in width. The pressed belly is called a slab. The chilled bacon slab is then run through a slicer, which is set to cut a predetermined thickness of slice. The ends of the bacon slices are then cut off as they generally comprise mainly fat and the finished length of bacon slice is generally about 5" to 6½" in length, as mentioned.

The thickness of slice is generally given in terms of slices per pound. For the purposes of this invention a thickness of between 20 and 32 slices per pound may be employed, although, between 24 and 28 slices per pound (prior to being cooked) is preferred for reasons which will be explained hereafter. The normal width of a bacon strip is about 1" to 1½" wide and is somewhat irregular.

The smoked bacon, after being sliced, is pre-cooked for a period of time sufficient to enable approximately 60–70% or more, of its initial weight to be drained off as fat, and the pre-cooked or pre-broiled bacon strips are then ready for packaging.

A plurality of pre-cooked bacon strips 10 are first enveloped within a strip of metal foil 12, the commencement of which envelopment is shown in FIG. 1. The bacon strips 10 are usually arranged in overlapping relationship so that the overall width of the finished package can be kept as small as possible while the thickness is kept well within the dimensions of the toaster slot. The dimensions of the conventional toaster slot are about five inches in depth (the depth being measured when the toaster slot is depressed to its maximum depth), about one inch in width and about five inches in length.

The strip of metal foil 12 employed is generally of between about 0.001 to 0.0035 inch in thickness, about 16–18 inches in length and 4–5 inches in width. The foil 12 is thinly coated on its entire interior surface with an inert, heat-fusible plastic such as polyvinyl chloride. Such a plastic coating 14 (see FIGS. 1 and 4) is usually found to be required in order to prevent metal-to-food contact. It is found that, if direct contact of a salted or acidified food is made with the metal walls of the package, a chemical reaction takes place resulting in the food product acquiring a metallic taste. Container corrosion also may occur. The metal foil presently preferred is aluminum foil because of its great heat conductivity and small heat capacity, although stainless steel foil may also be employed.

In order to effectively prevent metal-to-food contact, many types of inert plastic coatings are usable. Typical of these are polyethylene resins such as Monsanto MPE 70 and polypropylene resins such as Bakelite® polypropylene. The coating thicknesses preferred range from between about one-tenth mil to about 1 mil.

The final edge of the finished package of my invention is preferably heat-sealed, as will be described, and the plastic coating 14 is therefore also preferably required to be of the heat-sealable or heat-fusible type. By heat-sealable or heat-fusible it is meant that, at a temperature of between about 210° F. to about 500° F. the plastic coating will melt or soften and bond to itself. Thus the aforementioned interior coatings are all heat-sealable as well as being capable of providing a barrier layer between the metal walls of the package, and the food product contained therein.

The exterior surface of metal foil 12 is then coated so as to be electrically insulated, as will now be described. The exterior surface of the entire metal foil 12 is coated with high heat-resistant, electrically insulative metal adhering plastic coating 18. For example, epoxy resin formulations, such as Epon® 812, 828, 834 and 872 may be employed. Other usable plastics are various types of polyester and alkyd materials such as Laminac® polyester resin No. 4232, and Glaskyd® 1901. These heat resistant, electrically insulative metal adhering plastic resins or plastic coatings generally are laid down, by conventional methods, on the metal foil 12 in thicknesses ranging from about one-tenth mil to about 1 mil. A heat resistant sufficient to withstand the heat generated within the toaster is required, this temperature being in the range of 350° F. to 500° F.

The coated foil, just described, generally has uncoated edges, e.g. edges 12a and 12b in FIG. 1 and while these edges may be coated with an insulative coating of epoxy resin, by dipping or the like, the complete coating of these edges proceeds with some difficulty. For this reason, the completed package of this invention is formed with the raw edges of the initial piece of coated foil left in its uncoated state, but folded and otherwise manipulated in such a manner as to prevent the raw edges from contacting the heating coils or elements of a toaster.

Referring now to FIG. 1, one preferred form of packaging the food product is there shown wherein the coated metal foil 12 is first folded over onto itself at fold line 15, by the curved arrow, to form superposed sheets as shown in FIG. 1, and each pair of side edges 12a of the superposed sheets are then double folded so that the raw side edges 12a, of the foil 12 are completely encased by the insulated exterior coating 18 of the foil. The package is now closed on both of its sides, and on one end.

The package, with the bacon strips positioned therein approximately as shown in FIG. 2, is then preferably subjected to pressure, as by being passed between a pair of closely spaced rollers, in order to expel air from the package and to compress the entire package into as compact a unit as possible. The remaining end 21 of the package 20 is then heat-sealed in a conventional manner, the heat sealing border having a width of about ¼ of an inch (see FIG. 2). Raw edges 12b are still exposed but will not be in a position to cause short circuiting for reasons that will now be described.

The package 20 has a legend printed thereon, near the heat sealed end 21, such as "THIS END UP IN TOASTER." (This completed package will keep for months under refrigeration.)

The completed package 20 may be inserted into the slot of a toaster 22 whenever desired so that end edges 12b of end 21 are uppermost. The package 20 is substantially longer than the maximum depth of the toaster slot, i.e. when the toaster is in its operating condition. Thus while end edges 12b are raw, uninsulated edges, it is not necessary to cause them to be insulated because they do not come into contact with the toaster coils, or elements, nor do they come into the vicinity of said coils or elements.

As a modification of the above packaging procedure, it may sometimes, be found desirable to notch or cut-out a small portion of the coated metal foil 12 at each of the ends of the fold line 15, the triangular notch or cut-out being designated by the numeral 24. When this is done, either prior to or after the folding of the coated foil 12 along line 15, no part of the raw edges 12a will be colinear with the fold line 15. After the fold along 15 is made, and after the double fold along the sides is made, the lowermost point of the encased raw edges 12a is indicated by the numerals 12c in FIG. 2. The dotted lines 24a in FIG. 2, indicate the final position of triangular notch or cutout 24. It will be seen that by this procedure, no part of raw edges 12a can be colinear with fold line 15, or extend below it (as viewed in FIG. 2) and thereby possibly cause short circuiting. As an alternative to the provision of a notch or cut-out 24, the coated foil 12 can be first folded along line 15, and each pair of sides of the coated foil, so formed, can be tucked in along lines 24a, and the sides can then be double folded as described previously.

The exterior electrically insulative coating 18 is generally darkened by the addition of a small amount of carbon black, manganese dioxide, etc. to the plastic formulation. This darkening is found to be necessary in certain types of toasters operating on heat radiation principle. The proper emissivity coefficient can also be obtained by the addition of clays, such as kaolin to the plastic formulation. In toasters operating on a time control principle, the exterior insulative plastic coating 18 need not be darkened or otherwise modified.

The package 20 is normally vented while it is in the toaster by any suitable means such as by merely cutting off one corner of the package just prior to the heating thereof. Because the package is vented, the interior thereof does not normally exceed a temperature of about 210° F. and the interior heat-fusible coatings, having a softening point of about 210° F. or above, are not softened under the short heating times, one to several minutes, here involved.

Another form of package can be employed where a pair of continuous webs of foil of appropriate width (e.g. 4–5") coated both exteriorly and interiorly as previously described, are desired. Referring to FIG. 6, bacon strips 30 are laid on the lower coated foil 32. The upper coated foil 34 is then laid onto the lower coated foil 32, and both coated foils are cut so that a finished package 40 (see FIG. 8) of approximately 8–9" in length will result.

The right-hand coated foil ends, designated by the numeral 38 which are to be placed within the toaster, form the lower ends of the package 40. These ends 38 are first paired and then double folded, as a pair, so that the raw edges 42 thereof are enveloped by the coated foil or sheet material. The sides of the webs of foil are then paired and double folded, as described previously, so that the raw edges 44 of these sides are enveloped by the coated foil. The same notching, cut-out, or tuck procedure described with reference to FIGS. 1 and 2, may be followed here, if desired, in order to insure that the raw edges 44 will not be positioned below the lower edge of the package 40.

The package 40 is then subjected to pressure, as described previously with reference to package 20, and the upper end 46 of the package is heat-sealed, crimped or otherwise sealed. Raw edges 48 of the foil of package 40 are left exposed and uninsulated as in package 20 but the package has no raw edges exposed to or in the vicinity of the heating elements of a toaster since the only exposed edges 48 are well above the high point of the toaster coil or elements, when properly positioned in the toaster.

Another packaging modification is shown in FIGS. 9 and 10 wherein a single web of aluminum foil 50 interiorly and exteriorly coated as previously described, has its sides 52 turned inwardly towards each other prior to being folded about line 54 in the counter-clockwise direction indicated by the arrow 55. The raw edges of the sides 52 are indicated by the numeral 56.

The longitudinal fold, about line 54, is then made, thereby completely enclosing raw side edges 56. The sides 58 are then crimped (as shown) or otherwise made adherent, and the upper end 60 is also crimped (as shown) heat-sealed, or otherwise made adherent. The raw edges 62 at the upper end 60 of the finished package 64 are not placed in the vicinity of the toaster heating coils because the finished package is substantially longer than the toaster slot depth, and the package is placed in the toaster so that the end 60 is always uppermost.

It will be understood, from the foregoing, that an electrically insulated metal foil package has been provided, for heating in a toaster, or the like wherein the package is longer than the maximum toaster slot depth so that the package projects therefrom, and more particularly, so that the upper end of the package is removed from the vicinity of the toaster heating coils or heating elements.

The package may be completely insulated, by being dipped, or otherwise coated, in an electrically insulative heat-resistant plastic resin. However, it is preferable to insulate the raw edges of the package by the manipulative combination of single and double folding herein described.

It will also be understood that the interior coating is not only inert and thereby serves as a barrier layer preventing food to metal contact—but the coating is heat-fusible above the temperatures generated within the interior of the package during the heating in the toaster.

The packages of our invention, while electrically insulative, are nevertheless highly heat conductive because of the intermediate metal foil in the sheet material comprising the package walls. The food product, within the package, will, therefore generally be heated rapidly in one normal toasting cycle. The inner and outer plastic coatings on the sheet material are generally held within the $\frac{1}{10}$ mil to 1 mil thickness described previously so that heat may be readily conducted to the food product.

While several preferred embodiments of this invention has been disclosed in detail, other modifications may be made which are apparent to those skilled in the art. Hence, the claims which follow define the scope of this invention.

What is claimed is:

1. An elongated package of food suitable for heating in a toaster which includes:
    a precooked food product encased in a wrapping comprising at least one sheet of elongated sheet material, said sheet material comprising an inner coating of plastic material inert with respect to said food product, an intermediate layer of metal foil, and a plastic coating of electrically insulative, heat-resistant material completely covering at least the exterior surface of said metal foil facing away from said inner coating, the side edges and one normally lower end edge of said sheet material being folded in such a fashion that the raw edges are not exteriorly exposed, the elongated package being of substantially greater length than the maximum depth of the toaster slot in said toaster, and the normally upper edges of said package being sealed without folding.

2. The package of claim 1 wherein said side edges and said one end edge are at least double folded and the remaining end of said elongated sheet material is sealed.

3. The package of claim 1 wherein said side edges adjacent said one end edge are cut on a bias so that no part of said side edges is colinear with said one end edge.

4. The package of claim 1 wherein said inner coating has a thickness of between about $\frac{1}{10}$ mil to about 1 mil, the metal foil thickness lies between about 0.001 inch and 0.0035 inch and said exterior electrically insulative plastic coating has a thickness of between about $\frac{1}{10}$ mil to about 1 mil.

5. The package of claim 1 wherein said package is formed from a single piece of individual sheet material, one end edge of said sheet material being aligned with the opposite end edge of said sheet material so that a pair of superposed sheets are formed, said inner coating being on the interior side of said superposed sheets of material, each pair of side edges of said superposed sheets being at least double folded so that said side edges are enclosed within said sheet material, the remaining ends of said superposed sheets being sealed.

6. The package of claim 1 wherein said package is formed from a superposed pair of sheets of said sheet material, one pair of end edges and both pair of side edges of said superposed pair of sheets, being at least double folded so that both pairs of said side edges and said one pair of end edges are enclosed within said folds of said sheet material, the remaining ends of said superposed sheets being sealed.

7. The package of claim 1 wherein said inner coating is polyvinyl chloride and said electrically insulative plastic coating is an epoxy resin.

8. The package of claim 1 wherein said inner coating of plastic material is heat-fusible above a temperature of about 210° F.

9. The package of claim 1 wherein the exterior electrically-insulative plastic coating is darkened.

10. An elongated package of food suitable for heating in a toaster which includes:
    a precooked food product encased in a wrapping comprising a single elongated sheet, said sheet comprising a coating of inert plastic material inert with respect to said food product, an intermediate layer of metal foil, and a plastic coating of electrically insulative, heat resistant material completely covering at least the surface of said metal foil which faces away from said coating of inert plastic material, one end edge of said sheet being aligned with the other end edge of said sheet so that a pair of superposed sheets are formed with said coating of inert plastic material being in the inner side of said superposed sheets, each of said superposed sheets being longer than the depth of a toaster slot in operative position, said superposed sheets in aligned relation having two pairs of side edges, one folded, normally lower end edge and one pair of open, normally upper, end edges, each pair of said side edges being at least double folded so that the side edges of said layer of metal foil are completely enclosed within said plastic coating of electrically insulative material and said edges of said normally upper end being sealed without folding.

11. An elongated package of food suitable for heating in a toaster which includes:
    a precooked food product encased in a wrapping formed from a pair of superposed elongated sheets comprising a coating of inert plastic material inert with respect to said food product, an intermediate layer of metal foil, and a plastic coating of electrically insulative, heat resistant material completely covering at least the surface of said metal foil which faces away from said coating of inert plastic material, said coating of inert plastic material being on the inner side of said wrapping, said elongated sheets having a length greater than the depth of a toaster slot in operative condition, said superposed sheets having two pairs of side edges, a normally lower pair of end edges and a normally upper pair of end edges, each of the said pairs of side edges and said pair of normally lower end edges being at least double folded so that the corresponding edges of said layer of metal foil are enclosed within said plastic coating of electrically insulative material, said pair of normally upper end edges being sealed and not folded.

References Cited

UNITED STATES PATENTS

| | | | |
|---|---|---|---|
| 2,465,841 | 3/1949 | Bonini | 99—174UX |
| 2,609,301 | 9/1952 | Lindsey | 99—174 |
| 2,807,550 | 9/1957 | Zarotschenzeff et al. | 99—174 |
| 2,902,396 | 9/1959 | Reynolds | 99—174X |
| 2,912,336 | 11/1959 | Perino | 99—174 |
| 3,185,372 | 5/1965 | Ferraro | 99—174UX |

FOREIGN PATENTS

| | | | |
|---|---|---|---|
| 222,256 | 10/1924 | Great Britain | 229—53 |

WILLIAM T. DIXSON, Jr., Primary Examiner

U.S. Cl. X.R.

206—46; 229—3.5